(12) United States Patent
Wang et al.

(10) Patent No.: US 7,022,635 B2
(45) Date of Patent: Apr. 4, 2006

(54) TEMPERATURE-STABLE DIELECTRIC CERAMIC COMPOSITION FOR MULTILAYER CERAMIC CAPACITORS WITH BASE-METAL ELECTRODES

(75) Inventors: Xiaohui Wang, Beijing (CN); Renzheng Chen, Beijing (CN); Zhilun Gui, Beijing (CN); Longshi Li, Beijing (CN)

(73) Assignee: Tsinghua University, Beijing (CN)

( * ) Notice: Subject to any disclaimer, the term of this patent is extended or adjusted under 35 U.S.C. 154(b) by 25 days.

(21) Appl. No.: 10/683,468

(22) Filed: Oct. 10, 2003

(65) Prior Publication Data
US 2004/0138050 A1 Jul. 15, 2004

(30) Foreign Application Priority Data
Oct. 14, 2002 (CN) ............................... 02131431 A

(51) Int. Cl.
*C04B 35/468* (2006.01)
(52) U.S. Cl. ..................... 501/138; 501/139; 361/321.4
(58) Field of Classification Search ........ 501/137–139; 361/321.4
See application file for complete search history.

(56) References Cited

U.S. PATENT DOCUMENTS 5,268,342 A * 12/1993 Nishiyama et al. ......... 501/138
5,403,797 A * 4/1995 Ohtani et al. ............... 501/138
5,646,081 A * 7/1997 Nishiyama et al. ......... 501/138
5,818,686 A * 10/1998 Mizuno et al. ............. 361/311
6,777,363 B1 * 8/2004 Park et al. .................. 501/139

FOREIGN PATENT DOCUMENTS

| EP | 0820074 | * | 1/1998 |
| EP | 1094689 | * | 4/2001 |
| JP | 6-340472 | * | 12/1994 |

* cited by examiner

*Primary Examiner*—Karl Group
(74) *Attorney, Agent, or Firm*—Millen, White, Zelano & Branigan, P.C.

(57) ABSTRACT

The present invention relates to a temperature-stable dielectric ceramic composition for multilayer ceramic capacitors. The said dielectric composition comprises barium titanate and additives, wherein the barium titanate ranges from 94 to 99 mol % of the said composition, and the additives range from 1 to 6 mol % of the said composition. The additives comprise oxides of Mg, Ca, Ba, Si and Mn, and oxides of one or more elements selected from the group consisting of Co, Sr, Ti and Fe, and an oxide of Re, or carbonates, hydroxide, oxalates, acetates or nitrates of the above elements. Re represents one or more elements selected from Y, La, Ce, Pr, Nd, Sm, Eu, Gd, Tb, Dy, Ho, Er, Tm, Yb and Lu. After being sintered at 1200° C. to 1350° C. under reducing atmosphere, the room-temperature dielectric constant of the composition is 2000 to 3500 and its temperature coefficient of capacitance satisfies X7R characteristic (EIA standards). The composition is useful as material for multilayer ceramic capacitor with ultra-thin dielectric layer (thickness less than 10 μm).

17 Claims, 3 Drawing Sheets

TEMPERATURE-STABLE DIELECTRIC CERAMIC COMPOSITION FOR MULTILAYER CERAMIC CAPACITORS WITH BASE-METAL ELECTRODES

FIELD OF THE INVENTION

The present invention relates to a dielectric ceramic composition and, more particularly, a dielectric ceramic composition used as a temperature-stable dielectric material for multilayer ceramic capacitors employing a base metal such as nickel as a material of internal electrodes.

TECHNICAL BACKGROUND

With rapid development of various types of electronic devices, there is a tendency that these devices are increasingly produced in compact and lightweight design. In particular, the tendency toward compact and lightweight design is more remarkable in the portable type electronic devices to be used in camera-integrated video tape recorder, portable telephone set, note-book personal computer, palm-top computer, etc. The component parts for these devices are also increasingly produced in compact and lightweight design. The means for mounting the electronic components are also changing to surface mounting technology (SMT). Small components such as capacitor and resistor are called "chip components".

Multilayer Ceramic Capacitor (MLCC) is a widely used typical chip component.

The Electronic Industry Association (EIA) prescribes a standard for temperature coefficient of capacitance (TCC) for a type of MLCC known as the X7R Capacitor. The X7R characteristic requires that with reference to the capacitance at 25° C., the change of the capacitance (i.e. TCC) be within ±15% over the temperature range from −55° C. to 125° C.

When MLCC based on $BaTiO_3$ were sintered in air at high temperatures, it is required to use noble metals (e.g., palladium, platinum, etc.) as internal electrodes, which do not melt and do not oxidize even when being fired in an atmosphere with a high partial pressure of oxygen. However, the use of such noble metals becomes a barrier to cut down the production cost of multilayer ceramic capacitors. For example, the cost of internal electrodes occupies about 30 to 70% of the production cost of multilayer ceramic capacitors.

For the reasons mentioned above, it is preferred to use a base metal such as Ni, Fe, Co, W or Mo as the material of internal electrodes. However, if such base metals are used as a material for internal electrodes and fired in the conventional firing conditions of the dielectric ceramic materials, they oxidize easily and loose functions as the internal electrodes. Thus, in order to use such a base metal as a material for internal electrodes of multilayer ceramic capacitors, it is required to use a dielectric ceramic material which is never semiconductorized even if being fired in a neutral or reducing atmosphere with a low partial pressure of oxygen, and which has a sufficient insulation resistance and good dielectric properties.

Usually, the dielectric sheets and the internal electrodes were stacked together. The laminated bodies were then sintered at 1200° C.–1400° C. under reducing atmosphere created by $N_2$—$H_2$—$H_2O$ gas system and then annealed at 1000° C.–1100° C. under weak-oxidation atmosphere with a partial pressure of oxygen of $10^{-6}$ atm or higher.

To meet the requirements of X7R, there have been proposed some non-reducible dielectric ceramic materials. For example, JP-A-63-103861 discloses a composition of $BaTiO_3$—MnO—MgO-Rareearth element system. However, this dielectric ceramic composition is of no practical use since its insulation resistance and temperature coefficient of capacitor are affected by the grain size of the main component $BaTiO_3$, thus making it difficult to control the composition to obtain stable dielectric properties.

In U.S. Pat. No. 5,403,797A, a composition of $BaTiO_3$—$Y_2O_3$—MgO—$V_2O_5$ is disclosed. Although its dielectric constant at room temperature is greater than 2500, its sintering temperature is higher than 1350° C. and the TCC at −55° C. is near −15% with dielectric loss higher than 2%. So this composition is not suitable for industrial production.

SUMMARY OF THE INVENTION

The object of the present invention is to provide a dielectric ceramic composition for temperature-stable base-metal-electrode multilayer ceramic capacitor. The dielectric ceramic composition comprises barium titanate and additives, wherein the barium titanate ranges from 94 to 99 mol % of the said composition, and the additives range from 1 to 6 mol % of the said composition. The additives include oxides of Mg, Ca, Ba, Si and Mn, and oxides of one or more elements selected from the group consisting of Co, Sr, Ti and Fe, and an oxide of Re, or carbonates, hydroxide, oxalates, acetates or nitrates of the above elements, wherein Re represents one or more elements selected from Y, La, Ce, Pr, Nd, Sm, Eu, Gd, Tb, Dy, Ho, Er, Tm, Yb and Lu. The average grain size of the barium titanate is less than 1000 nm.

The multilayer ceramic capacitor is manufactured through the following process:

1. Powders of $BaTiO_3$ and the additives were mixed and milled for several hours then dried;
2. The mixture was then mixed with an organic binder and a solvent to provide a ceramic slurry, which was used for preparing green sheets;
3. A conductive paste having Ni, Fe, Co, W or Mo powder as a main component was applied on the green sheets to form internal electrodes. Some sheets of the ceramic green sheets having the internal electrodes thereon were stacked and thermocompressed to form a laminated body. The laminated body was then diced into chip-shaped ceramic bodies;
4. The organic binder contained in the chip-shaped ceramic bodies was removed;
5. The binder-removed ceramic bodies were then sintered under an atmosphere having oxygen partial pressure in the order of $10^{-8}$~$10^{-12}$ atm at 1200° C.~1350° C. and then were reoxidized in a weak oxidation atmosphere with oxygen partial pressure of $10^{-5}$~$10^{-4}$ atm at 800° C.~1100° C.
6. Cu or Ag terminal electrode was mounted and heated at 600° C.~800° C. under $N_2$ atmosphere.

The room-temperature dielectric constant of the composition after being sintered at 1200° C. to 1350° C. under reducing atmosphere is 2000 to 3500 and the temperature coefficient of capacitance satisfies X7R characteristic (EIA standards). The dielectric loss of the composition is less than 2%. The material made of the composition has high insulation resistance. The composition is useful as dielectric material for multilayer ceramic capacitor with ultra-thin dielectric layer (thickness less than 10 μm).

BRIEF DESCRIPTION OF THE DRAWINGS

Embodiments of the invention are described with reference to the accompanying drawings.

PREFERRED EMBODIMENTS

Figure 1:
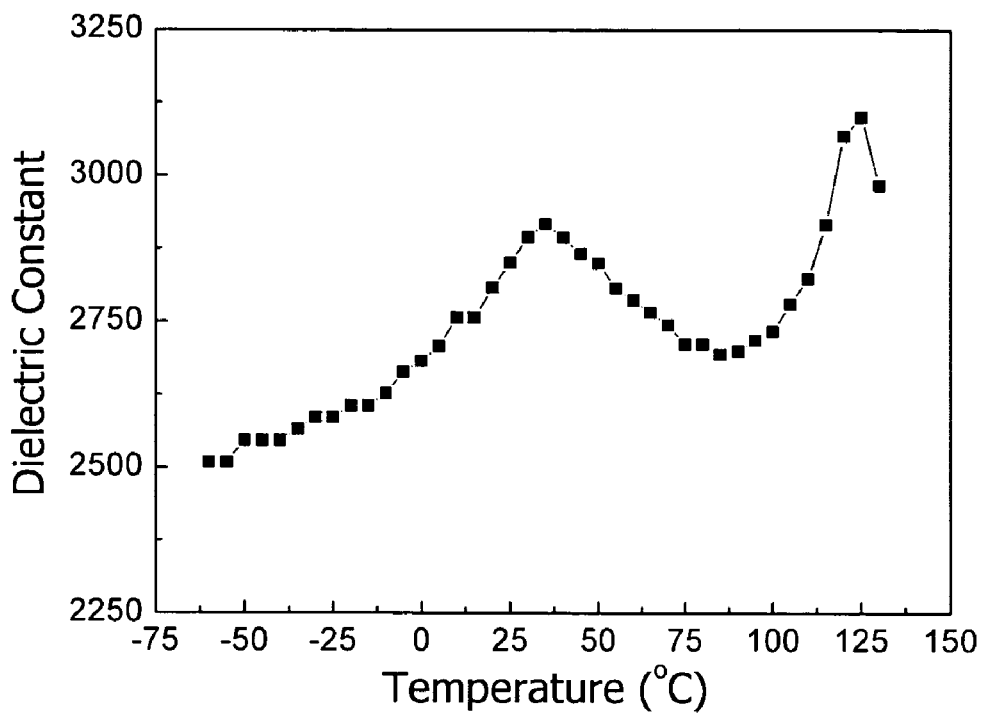
FIG. 1 illustrates a graph of the dielectric constant as a function of temperature of the example 1.

The present invention provides a dielectric ceramic composition for temperature-stable base-metal-electrode multilayer ceramic capacitor. The said composition comprises barium titanate and additives, wherein the barium titanate ranges from 94 to 99 mol % of the composition, and the additives range from 1 to 6 mol % of the composition. The additives comprise oxides of Mg, Ca, Ba, Si and Mn, and oxides of one or more elements selected from the group consisting of Co, Sr, Ti and Fe, and an oxide of Re, or carbonates, hydroxide, oxalates, acetates or nitrates of the above elements. Re represents one or more elements selected from Y, La, Ce, Pr, Nd, Sm, Eu, Gd, Tb, Dy, Ho, Er, Tm, Yb and Lu. The average grain size of the barium titanate is less than 1000 nm, preferably 100 nm to 1000 nm.

The additives in the dielectric ceramic composition preferably comprise about 0.1 to 2 mol % of an oxide of Mg; 0.1 to 3 mol % of an oxide of Ca; 0.01 to 2 mol % of an oxide of Ba; 0.1 to 5 mol % of an oxide of Si; 0.01 to 3 mol % of an oxide of Mn; 0 to 2 mol % of an oxide of Sr; 0 to 3 mol % of an oxide of Co; 0 to 1 mol % of an oxide of Fe; 0 to 1 mol % of an oxide of Ti; 0 to 4 mol % of an oxide of Re, wherein the contents of the oxides of Mg, Ca, Ba, Si and Mn are calculated by assuming that the oxides of Mg, Ca, Ba, Si and Mn are MgO, CaO, BaO, $SiO_2$ and $MnO_2$ respectively; and the contents of oxides of Co, Sr, Ti and Fe are calculated by assuming that the oxides of Co, Sr, Ti and Fe are $Co_2O_3$, SrO, $TiO_2$ and $Fe_2O_3$ respectively; Re represents one or more elements selected from the group consisting of Y, La, Ce, Pr, Nd, Sm, Eu, Gd, Tb, Dy, Ho, Er, Tm, Yb and Lu and the content of the oxide of Re is calculated by assuming that the oxide of Re is $Re_2O_3$.

In the dielectric ceramic composition, the elements of Si, Ba, Ca and Ti are partially in form of a glass component, $(Ba_A Ca_{(1-A)} O)_X \cdot (Si_B Ti_{(1-B)} O_2)$, wherein $0 \leq A$, $B \leq 1$, $0.9 \leq x \leq 1.1$, and t glass component ranges from 0 to 3 wt % of the total weight of the ceramic composition. The glass component is prepared by the calcination at 1000 to 1200° C. of the mixture of the oxides, carbonates, hydroxide, oxalates, acetates or nitrates of Si, Ba, Ca and Ti according to the values of A, B and x.

The multilayer ceramic capacitor of the present application is manufactured through the following process:

1. Powders of $BaTiO_3$ and the additives were mixed and milled in an aqueous medium for several hours and then dried at 70° C.~110° C.;
2. The mixture was then mixed with an organic binder and a solvent to provide a ceramic slurry, which was then used for preparing green sheets having a thickness of 10 μm or thinner by employing a doctor blade method;
3. A conductive paste having Ni, Fe, Co, W or Mo powder as a main component was applied on the green sheets by using a print method to form internal electrodes. Some sheets of the ceramic green sheets having the internal electrodes thereon were then stacked and thermocompressed to form a laminated body. The laminated body was then diced into chip-shaped ceramic bodies;
4. The organic binder contained in the chip-shaped ceramic bodies was removed in air or an $N_2$ atmosphere at 300° C. or higher;
5. The binder-removed ceramic bodies were then sintered under an atmosphere having oxygen partial pressure in the order of $10^{-8} \sim 10^{-12}$ atm at 1200° C.~1300° C. and were reoxidized in a weak oxidation atmosphere with oxygen partial pressure of $10^{-5} \sim 10^{-4}$ atm at 800° C.~1100° C.;
6. Cu or Ag terminal electrode was mounted and heated at 600° C.~800° C. under $N_2$ atmosphere.

EXAMPLES

Example 1

Powders of 96 mol % $BaTiO_3$ with an average grain size of 400 nm, 0.5 mol % $CaTiO_3$, 0.3 mol % CaO, 0.8 mol % $SiO_2$, 0.3 mol % SrO, 0.2 mol % $MnO_2$, 0.2 mol % MgO, 0.2 mol % $CO_2O_3$, 0.5 mol % $Y_2O_3$, and 1.0 mol % $Sm_2O_3$ were mixed. Then 2 wt % (based on the total weight of the mixture) glass component $(Ba_A Ca_{1-A} O)_X \cdot (Si_B Ti_{1-B} O_2)$ with A=0.4, B=0.9, x=1.1 was added. The mixture was ground for 15 hours by employing a wet method in a ball mill containing therein PSZ (Partially Stabilized Zirconia) balls, then dried at 110° C. for 8 hours.

Figure 2:
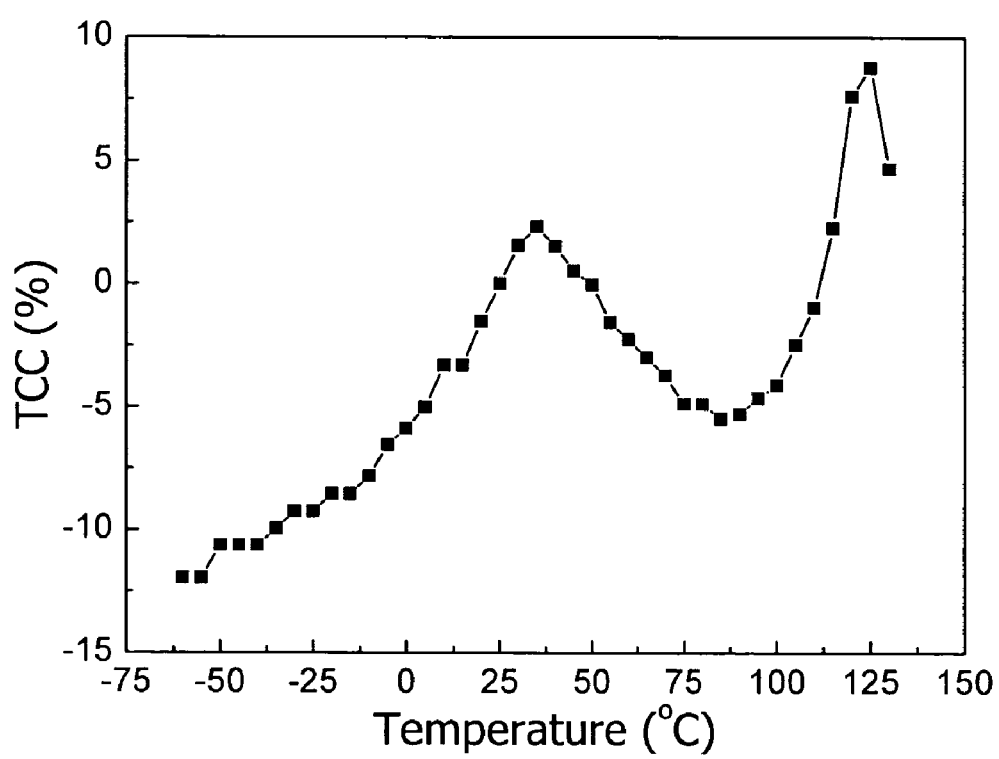
FIG. 2 illustrates a graph of the TCC as a function of temperature of the example 1.

The mixture was then mixed with polyvinyl butyral as an organic binder and toluene to provide a ceramic slurry, which was then used for preparing green sheets having a thickness of 10 μm by employing doctor blade method. Subsequently, a conductive paste having Ni powder as a main component was applied on the green sheets by using a print method to form internal electrodes. Nine sheets of the ceramic green sheets having the internal electrodes thereon were stacked and thermocompressed to form a laminated body. The laminated body was then diced into a multiplicity of EIA 0603 type chip-shaped ceramic bodies. The organic binder contained in the chip-shaped ceramic bodies was removed in an $N_2$ atmosphere at 300° C. The binder-removed ceramic bodies were then sintered under an atmosphere having oxygen partial pressure in the order of $10^{-10}$ atm at 1250° C. and were reoxidized in a weak oxidation atmosphere with oxygen partial pressure of $10^{-5}$ atm at 1100° C. Cu terminal electrode was mounted and heated at 700° C. for 1 hour under $N_2$ atmosphere. The dielectric properties of the capacitor obtained were measured and shown in Table. 1. FIG. 1 illustrates a graph of the dielectric constant as a function of temperature of the example 1. FIG. 2 illustrates a graph of the TCC as a function of temperature of the example 1.

Example 2

Powders of 95.2 mol % $BaTiO_3$ with an average grain size of 200 nm, 0.7 mol % $CaTiO_3$, 0.4 mol % CaO, 0.8 mol % $SiO_2$, 0.3 mol % SrO, 0.3 mol % $MnO_2$, 0.3 mol % MgO, 0.2 mol % $CO_2O_3$, 0.8 mol % $Y_2O_3$, and 1.0 mol % $Lu_2O_3$ were mixed. Then 1.5 wt % (based on the total weight of the mixture) glass component $(Ba_4Ca_{1-A}O)_X \cdot (Si_BTi_{1-B}O_2)$ with A=0.5, B=0.8, x=1 were added. The mixture was ground for 20 hours by employing a wet method, and then dried at 100° C. for 10 hours.

Figure 3:
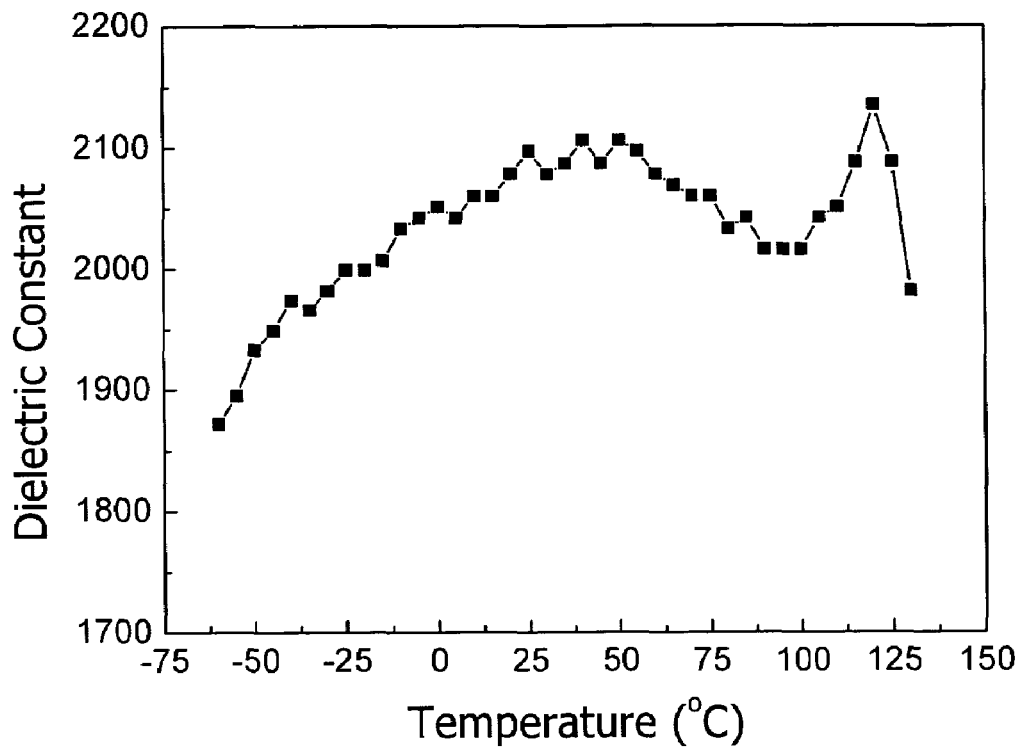
FIG. 3 illustrates a graph of the dielectric constant as a function of temperature of the example 2.
Figure 4:
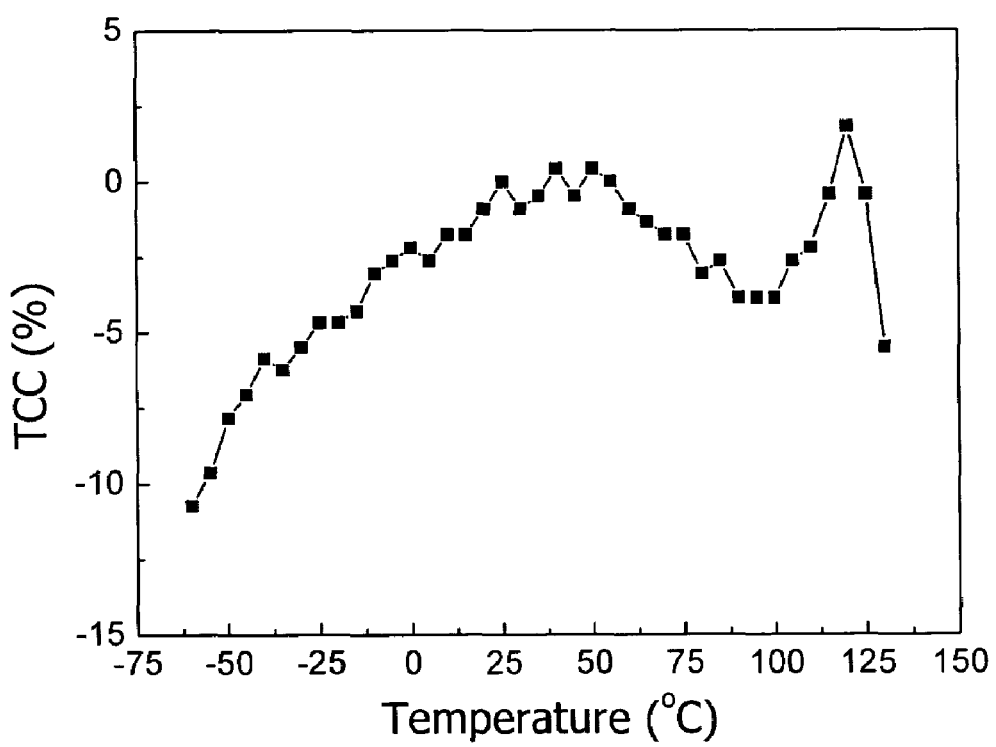
FIG. 4 illustrates a graph of the TCC as a function of temperature of the example 2.

The mixture was then mixed with polyvinyl butyral and a toluene to provide a ceramic slurry, which was then used for preparing green sheets having a thickness of 8 μm by employing doctor blade method. Subsequently, a conductive paste having Ni powder as a main component was applied on the green sheets by using a print method to form internal electrodes. Ten sheets of the ceramic green sheets having the internal electrodes thereon were stacked and thermocompressed to form a laminated body. The laminated body was then diced into a multiplicity of EIA 0603 type chip-shaped ceramic bodies. The organic binder contained in the chip-shaped ceramic bodies was removed in an $N_2$ atmosphere at 300° C. The binder-removed ceramic bodies were then sintered under an atmosphere having oxygen partial pressure in the order of $10^{-12}$ atm at 1200° C. and were reoxidized in a weak oxidation atmosphere with oxygen partial pressure of $10^{-5}$ atm at 1100° C. Cu terminal electrode was mounted and heated at 700° C. for 1 hour under $N_2$ atmosphere. The dielectric properties of the capacitor obtained were measured and shown in Table. 1. FIG. 3 illustrates a graph of the dielectric constant as a function of temperature of the example 2. FIG. 4 illustrates a graph of the TCC as a function of temperature of the example 2.

Example 3

Powders of 95 mol % $BaTiO_3$ with an average grain size of 500 nm, 0.7 mol % $CaTiO_3$, 0.4 mol % CaO, 0.7 mol % $SiO_2$, 0.3 mol % SrO, 0.5 mol % $MnO_2$, 0.4 mol % MgO, 0.2 mol % $CO_2O_3$, 0.7 mol % $Y_2O_3$, and 1.1 mol % $Gd_2O_3$ were mixed. Then 2.5 wt % (based on the total weight of the mixture) glass component $(Ba_4Ca_{1-A}O)_X \cdot (Si_BTi_{1-B}O_2)$ with A=0.5, B=0.9, x=1.1 were added. The mixture was ground for 20 hours by employing a wet method, and then dried at 110° C. for 8 hours.

Figure 5:
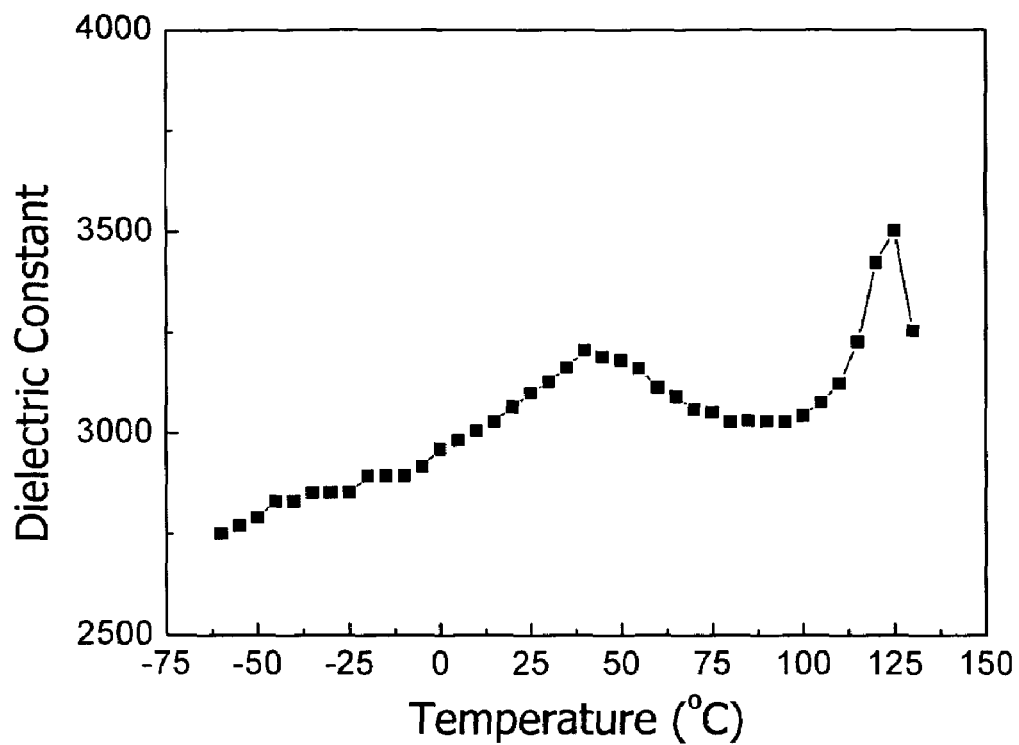
FIG. 5 illustrates a graph of the dielectric constant as a function of temperature of the example 3.
Figure 6:
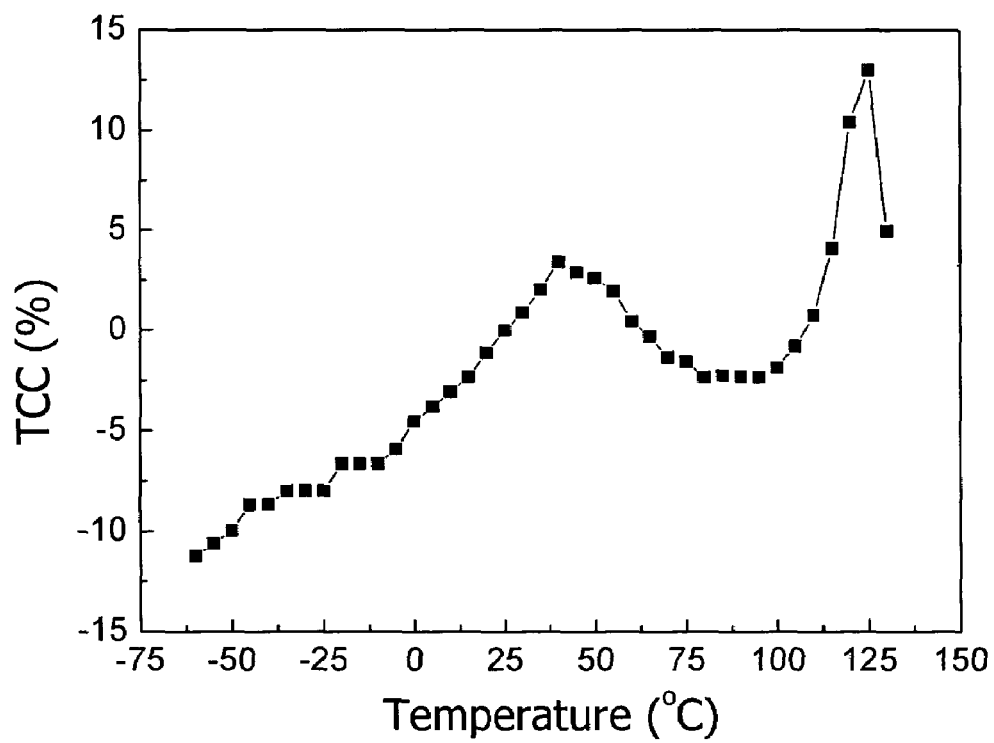
FIG. 6 illustrates a graph of the TCC as a function of temperature of the example 3.

The mixture was then mixed with polyvinyl butyral and toluene to provide a ceramic slurry, which was then used for preparing green sheets having a thickness of 10 μm by employing doctor blade method. Subsequently, a conductive paste having Ni powder as a main component was applied on the green sheets by using a print method to form internal electrodes. Ten sheets of the ceramic green sheets having the internal electrodes thereon were stacked and thermocompressed to form a laminated body. The laminated body was then diced into a multiplicity of EIA 0603 type chip-shaped ceramic bodies. The organic binder contained in the chip-shaped ceramic bodies was removed in an $N_2$ atmosphere at 350° C. The binder-removed ceramic bodies were then sintered under an atmosphere having oxygen partial pressure in the order of $10^{-11}$ atm at 1280° C. and were reoxidized in a weak oxidation atmosphere with oxygen partial pressure of $10^{-5}$ atm at 1100° C. Thereby the thickness of dielectric layer incorporated in the multilayer ceramic capacitor was about 7 μm. Cu terminal electrode was mounted and heated at 700° C. for 1 hour under $N_2$ atmosphere. The dielectric properties of the capacitor obtained were measured and shown in Table. 1. FIG. 5 illustrates a graph of the dielectric constant as a function of temperature of the example 3. FIG. 6 illustrates a graph of the TCC as a function of temperature of the example 3.

Table 1 shows the sintering temperatures (S.T.), dielectric constants ($\epsilon_{25°\ C.}$), dielectric loss tangents (tan ∈), TCC values at −55° C. and 125° C., insulation resistances (IR) and breaking electric fields ($E_B$) of the capacitors of the Examples 1, 2 and 3.

TABLE 1

| Example | S.T. (° C.) | $\epsilon_{25°\ C.}$ | $tg\delta_{25°\ C.}$ | TCC* (%) −55° C. | 125° C. | IR (Ω · cm) | $E_B$ (kV/mm) |
|---|---|---|---|---|---|---|---|
| 1 | 1250 | 2850 | 0.89 | −11.9 | 8.7 | $10.0 \times 10^{12}$ | 6.13 |
| 2 | 1200 | 2097 | 0.92 | −9.6 | −0.4 | $15.5 \times 10^{12}$ | 8.21 |
| 3 | 1280 | 3100 | 0.71 | −10.6 | 13 | $14.9 \times 10^{12}$ | 7.78 |

*TCC means the temperature coefficient of capacitor, and it is defined as: TCC(T)% = 100 × (C(T) − C(25° C.))/C(25° C.);

From the examples we can see, the X7R-type material for base metal electrode MLCC can be sintered at 1200–1350° C. under reducing atmosphere. The room-temperature dielectric constant of the composition is 2000 to 3500 and its temperature coefficient of capacitance is between ±15%. Its dielectric loss is less than 2.5%, insulation resistance is about $10^{13}$ Ω·cm and $E_B$ is greater than 5 KV/mm.

The dielectric ceramic composition and process of the present invention have the following advantages: the lower sintering temperature, controllable dielectric properties and more stable capacitors. The average grain size of the material is less than 1000 nm. The composition is useful as material for multilayer ceramic capacitor with ultra-thin dielectric layer (thickness less than 10 μm). Therefore, the dielectric ceramic composition of the present invention has bright future in the field of MLCC materials.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. Also, any preceding examples can be repeated with similar success by substituting the generically or specifically described reactants and/or operating conditions of this invention for those used in such examples.

Throughout the specification and claims, all temperatures are set forth uncorrected in degrees Celsius and, all parts and percentages are by weight, unless otherwise indicated.

The entire disclosure[s] of all applications, patents and publications, cited herein and of corresponding Chinese application No. 02131431.4, filed Oct. 14, 2002 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

We claim:

1. A dielectric ceramic composition suitable for use in a temperature-stable base-metal-electrode multilayer ceramic capacitor comprising
   (A) 94 to 99 mol % barium titanate with an average grain size of 500 nm or less, and
   (B) 1 to 6 mol % of carbonate, hydroxide, oxalate, acetate, oxide or nitrate of additives, which provide in said ceramic
      (1) oxides of Mg, Ca, Ba, Si and Mn, and
      (2) oxides of one or more of Co, Sr, Ti or Fe, and
      (3) an oxide of RE, wherein RE represents one or more of Y, La, Ce, Pr, Nd, Sm, Eu, Gd, Tb, Dy, Ho, Er, Tm, Yb or Lu,
   wherein Si, Ba, Ca and Ti in the additives (B) are partially in the form of a glass component of formula $(Ba_A Ca_{(1-A)} O_x \cdot (Si_B Ti_{(1-B)} O)_2)$, wherein $0 \leq A$, $B < 1$, $0.9 \leq x \leq 1.1$, and the glass component is 1.5 to 3 wt % of the overall dielectric ceramic composition, and
   wherein the glass component is prepared by forming a mixture of oxides, carbonates, hydroxide, oxalates, acetates or nitrates of Si, Ba, Ca and Ti according to the values of A, B and x and calcining the mixture at 1000 to 1200° C.

2. The dielectric ceramic composition of claim 1, wherein the additives comprise about
   0.1 to 2 mol % of MgO,
   0.1 to 3 mol % of CaO,
   0.01 to 2 mol % of BaO,
   0.1 to 5 mol % of $SiO_2$,
   0.01 to 3 mol % of $MnO_2$,
   0 to 2 mol % of SrO,
   0 to 3 mol % of $Co_2O_3$,
   0 to 1 mol % of $Fe_2O_3$,
   0.27 to 1 mol % of $TiO_2$, and
   1.5 to 4 mol % of $Re_2O_3$.

3. A multiplayer capacitor containing a ceramic formed from the dielectric ceramic composition as claimed in claim 1.

4. A multiplayer capacitor containing a ceramic formed from the dielectric ceramic composition as claimed in claim 2.

5. The dielectric ceramic composition of claim 1, wherein $B \leq 0.9$.

6. The dielectric ceramic composition of claim 1, wherein $B \leq 0.8$.

7. The dielectric ceramic composition of claim 1, wherein $0.8 \leq B \leq 0.9$.

8. The dielectric ceramic composition of claim 1, wherein the barium titanate with an average grain size of 100–500 nm.

9. The dielectric ceramic composition of claim 1, wherein the barium titanate with an average grain size of 400nm or less.

10. The dielectric ceramic composition of claim 1, wherein the barium titanate with an average grain size of 200nm or less.

11. A multiplayer capacitor containing a ceramic formed from the dielectric ceramic composition as claimed in claim 5.

12. A multiplayer capacitor containing a ceramic formed from the dielectric ceramic composition as claimed in claim 6.

13. A multiplayer capacitor containing a ceramic formed from the dielectric ceramic composition as claimed in claim 7.

14. A multiplayer capacitor containing a ceramic formed from the dielectric ceramic composition as claimed in claim 8.

15. A multiplayer capacitor containing a ceramic formed from the dielectric ceramic composition as claimed in claim 9.

16. A multiplayer capacitor containing a ceramic formed from the dielectric ceramic composition as claimed in claim 10.

17. The dielectric ceramic composition of claim 1, wherein the calcining temperature used is 1000 to less than 1200° C.

* * * * *

UNITED STATES PATENT AND TRADEMARK OFFICE
CERTIFICATE OF CORRECTION

| | | |
|---|---|---|
| PATENT NO. | : 7,022,635 B2 | Page 1 of 1 |
| APPLICATION NO. | : 10/683468 | |
| DATED | : April 4, 2006 | |
| INVENTOR(S) | : Xiaohui Wang et al. | |

It is certified that error appears in the above-identified patent and that said Letters Patent is hereby corrected as shown below:

Column 7, line 7, reads "$O_{x-}(Si$" should read -- $O_x(Si$ --
Column 7, line 17, reads "$O)_2$)," should read -- $O_2$), --

Signed and Sealed this

Twenty-fifth Day of July, 2006

JON W. DUDAS
*Director of the United States Patent and Trademark Office*